United States Patent [19]

Hann et al.

[11] Patent Number: 4,920,193

[45] Date of Patent: Apr. 24, 1990

[54] MEMBRANES

[75] Inventors: Richard A. Hann; David R. Holmes, both of Frodsham; John W. Smith, Liverpool, all of England

[73] Assignee: Imperial Chemical Industries PLC, London, United Kingdom

[21] Appl. No.: 221,434

[22] Filed: Jul. 19, 1988

Related U.S. Application Data

[62] Division of Ser. No. 865,831, May 22, 1986, abandoned.

[30] Foreign Application Priority Data

May 23, 1985 [GB] United Kingdom ................. 8513114

[51] Int. Cl.$^5$ .......................... C08J 3/08; C08L 81/06
[52] U.S. Cl. ................................ 528/171; 528/381; 528/382; 528/388; 528/361
[58] Field of Search ............... 528/171, 381, 382, 388, 528/391

[56] References Cited

U.S. PATENT DOCUMENTS

| | | | |
|---|---|---|---|
| 3,855,122 | 12/1974 | Bourganel | 210/638 |
| 3,875,096 | 4/1975 | Graefe et al. | 524/108 |
| 4,026,977 | 5/1977 | Bourganel | 210/500.41 X |
| 4,054,707 | 10/1977 | Quentin | 210/651 |
| 4,714,725 | 12/1987 | Hendy et al. | 524/108 |

FOREIGN PATENT DOCUMENTS

| | | |
|---|---|---|
| 8894 | 3/1980 | European Pat. Off. |
| 145305 | 6/1985 | European Pat. Off. |
| 203755 | 12/1986 | European Pat. Off. |
| 1258851 | 12/1971 | United Kingdom |

OTHER PUBLICATIONS

Hansen et al., "Solubility Parameters", Encyclopedia of Chemical Technology, 2nd Ed., Supplement 1971, pp. 889-910.
Hansen, Charles M., "The Universality of the Solubility Parameter", I&EC Prod. Research and Development, vol. 8, No. 1, Mar. 1969, pp. 2-11.
Barton, Allan F. M., "Solubility Parameters", Chemical Reviews, 1975, No. 6, pp. 731-763.
D. R. Lloyd et al; ACS Symposium Series 153, Synthetic Membranes, vol. 1, Ed. A. F. Turbak, 1981, 327-350; Poly(Aryl Ether) Membranes for Reverse Osmosis.
D. R. Lloyd et al; Desalination, 1983, 46, 327-334, Asymmetric Membrane Preparation from Non-Solvent Casting Systems.
D. R. Lloyd et al; A report prepared for ICI; May 1, 1984; Phase Inversion Preparation of Sulphonated Poly(Ether Sulphone) Asymmetric Membranes.
D. R. Lloyd et al; Polym. Mater, Sci. Eng., 50, Apr. 1984, 152-155; Asymmetric Membrane Preparation from Solventless Casting Systems.
D. R. Lloyd et al; ASC Polym. Mater, Sci. Eng., 51, 1984, 713-717; Use of the Three Component Solubility Parameter in Asymmetric Phase Inversion Membrane Preparation.
D. R. Lloyd et al; Journal of Membrane Science, 985, 22, 1-29; Phase Inversion Sulphonated Polysulphone Membranes.
D. R. Lloyd et al; Desalination, 1985, 56, 381-394; Poly (Ether Sulphone) Membranes for Desalination: Membrane Preparation and Characterization.

*Primary Examiner*—John Kight
*Assistant Examiner*—M. L. Moore
*Attorney, Agent, or Firm*—Cushman, Darby & Cushman

[57] ABSTRACT

An asymmetric membrane formed from a sulphonated polyarylethersulphone has a salt rejection of at least 99%. Alternatively, a membrane has a good salt rejection and an acceptable water flux such that the ratio $$\frac{\text{Flux (in } m.\text{day}^{-1})}{(100 - \% \text{ salt rejection})}$$

has the value of at least 0.7. The membranes can be obtained using barium salts of the sulphonated polyarylethersulphone, with the proportion of barium being controlled to be at least 85%, preferably at least 86%, and not more than 91%, preferably not more than 90% of the barium required to react with the sulphonic acid groups on the sulphonated polymer.

8 Claims, 1 Drawing Sheet

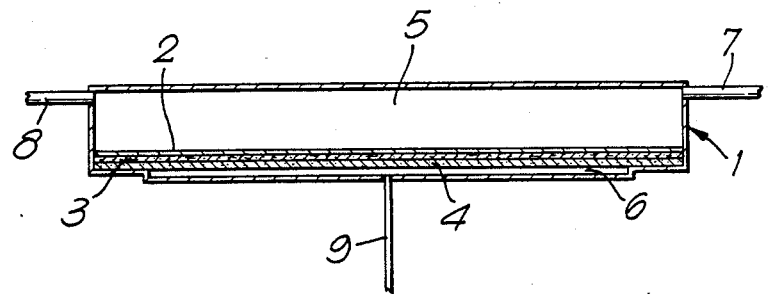

MEMBRANES

This is a division of application Ser. No. 865,831 filed May 22, 1986.

This invention relates to membranes, more particularly to asymmetric semi-permeable membranes, materials used for the production of such membranes, processes for the production of such membranes and the use of the membranes for the treatment of solutions and suspensions.

Membranes which are useful in separation processes such as ultrafiltration and reverse osmosis may be prepared from polymeric materials. Asymmetric semi-permeable membranes, which can be used for reverse-osmosis, can be prepared by casting a solution of a film-forming ion-exchange material on a support and then coagulating the film using a non-solvent for the ion-exchange material. Asymmetric semi-permeable membranes are characterised by having a thin dense layer which functions as the active layer of the membrane and a thicker porous layer which functions as a reinforcing support for the active layer.

British Patent Specification No. 1258851 discloses sulphonated polyarylethersulphones having a specified structure. These materials are disclosed as being ion exchange resins and as being suitable for the production of membranes for a number of applications including electrodialysis, fuel cell applications, osmosis and reverse osmosis. European Patent Specification No. 8894 discloses alternative sulphonated polyarylethersulphones which may be prepared by a simple and readily controlled sulphonation technique and these materials also may be used to produce membranes for desalination and other processes.

In a membrane used for reverse osmosis, a combination of high salt rejection at a high water flux is commercially very desirable but is difficult to achieve. Generally it is found that a membrane giving a high salt rejection provides only a low water flux and that a membrane giving a high water flux provides only a low salt rejection.

In our non prior published European Patent Application Publication No. 145305, we have disclosed an asymmetric semi-permeable membrane formed from a sulphonated polyarylethersulphone and having a salt rejection and a flux which are such that the ratio:

$$\frac{\text{Flux (in } m.\text{day}^{-1})}{(100 - \% \text{ salt rejection})}$$

has a value of at least 0.05 and which may be at least 0.1 In the working examples of European Patent Application Publication No. 145305, the highest value of the ratio is 0.66. Such membranes may be obtained from a solution containing the sulphonated polyarylethersulphone, and a divalent metal in a specific solvent mixture and the divalent metal is preferably barium.

We have now obtained membranes having improved properties compared to those disclosed in European Patent Application Publication No. 145305.

According to the present invention there is provided an asymmetric semi-permeable membrane wherein the support layer and the active layer are both formed from the same sulphonated polyarylethersulphone and the membrane has a salt rejection of at least 99%.

According to a further aspect of the present invention there is provided an asymmetric semi-permeable membrane wherein the support layer and the active layer are both formed from the same sulphonated polyarylethersulphone wherein the membrane has a salt rejection and flux which are such that the ratio $$\frac{\text{Flux (in } m.\text{day}^{-1})}{(100 - \% \text{ salt rejection})}$$

has a value of at least 0.7.

Preferred membranes in accordance with this further aspect of the present invention are those having a salt rejection and flux which are such that the ratio has a value of at least 0.8.

Particularly preferred membranes in accordance with the invention have a salt rejection of at least 99% and a salt rejection and flux which are such that the ratio $$\frac{\text{Flux (in } m.\text{day}^{-1})}{(100 - \% \text{ salt rejection})}$$

has a value of at least 0.7. Especially preferred membranes have a salt rejection of 99% and the ratio has a value of at least 0.8.

The membrane properties are conveniently determined in a reverse osmosis cell using a 0.2% by weight aqueous solution of sodium chloride at a gauge pressure of 41.4 bar (4.14MNm$^{-2}$ or 600 p.s.i.) and a temperature of 25° C.

For convenience hereafter, the relationship $$\frac{\text{Flux (in } m.\text{day}^{-1})}{(100 - \% \text{ salt rejection})}$$

will be referred to as the "membrane factor". Membranes in accordance with one aspect of the present invention have a salt rejection of at least 99.3% especially at least 99.4% and particularly at least 99.5%. Membranes in accordance with the further aspect of the present invention preferably have a membrane factor of at least 0.9 and especially at least 1.0.

The membranes of the present invention have improved resistance to aggressive materials, for example acid and alkali. Thus, the membranes of the present invention can be used to treat water containing aggressive materials which cause deterioration of membranes formed from other materials.

The membranes may be of any thickness provided they possess the desired salt rejection and/or membrane factor. It is preferred that the membrane thickness is such that the membrane possesses a salt rejection of 99% and the combination of salt rejection and water flux required to achieve a membrane factor of at least 0.7. The total membrane thickness can be in the range from 20 to 300 micrometers and we have obtained particularly useful properties with membranes of thickness in the range from 50 up to 250 micrometers, especially in the range 75 up to 200 micrometers.

The membrane is formed from a sulphonated polyarylethersulphone (hereinafter simply "sulphonated polysulphone"), particularly from a sulphonated polysulphone containing repeat units of the formula

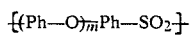    I wherein

Ph is a phenylene residue, preferably a para-phenylene residue, wherein at least some of the groups Ph are sulphonated; and m is 1 or 2 and the value of m can differ along the polymer chain.

Whilst the value of m may be either one or two, copolymers in which the value of m is one for some repeat units and is two for other repeat units are particularly preferred, polymers of this type being described, inter alia, in European Patent Specification No. 8894.

The preferred polymers have repeat units of the formula:

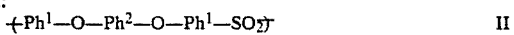    II together with the repeat units of the formula

    III wherein $Ph^1$ represents a phenylene residue, preferably a paraphenylene residue;

$Ph^2$ represents a phenylene residue, preferably a paraphenylene residue, having one or two groups $-SO_3M$;

M is a hydrogen atom, a metal atom and/or a group $NR^4$, wherein the groups M may be the same or different and the proportion of the groups M is sufficient to combine with the unsatisfied valencies of the group $-SO_3$; and R is a hydrogen atom or an alkyl group.

The sulphonated polysulphone may also include a proportion of unsulfonated copolymer having repeat units of the formula

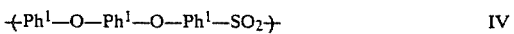    IV together with the repeat units of the formulae II and III, wherein $Ph^1$ is as defined.

In the repeat units of the formula II, when $Ph^2$ is an ortho- or para-phenylene residue, there is typically only one group $-SO_3M$, whereas when $Ph^2$ is a meta-phenylene residue there are typically two groups $-SO_3M$. When $Ph^2$ is an ortho-phenylene residue, the $-SO_3M$ group is located in a position which is para- to one ether group and meta- to the other ether group, any further sulphonation occurring to locate the $-SO_3M$ groups in positions meta- to each other. When $Ph^2$ is a para-phenylene residue, the $-SO_3M$ group is located in a position ortho- to one ether group and meta- to the other ether group. When $Ph^2$ is a meta-phenylene residue, the $-SO_3M$ groups are located in the positions ortho- to one ether group and para- to the other ether group.

The group M will be dependent on any treatment to which the membrane has been subjected during its preparation or subsequent use and not all of the groups M need be the same. Thus, the group M may be a mixture, for example of hydrogen, sodium and barium atoms.

The sulphonated copolymers may be prepared by sulphonating a copolymer consisting of repeat units III and IV. The sulphonation is readily effected by dissolving the copolymer in concentrated sulphuric acid (98% w/w) at ambient temperature and agitating the mixture for a sufficient time for sulphonation of essentially all of the sub-units $-O-Ph^1-O-$ in the repeat units of formula IV. The copolymers which are subjected to sulphonation suitably have from 1 to 99 mole % of units IV and correspondingly from 99 to 1 mole % of units III, and especially from 2.5 to 67 mole % of units IV and correspondingly from 97.5 to 33 mole % of units III. Sulphonation is desirably effected to convert at least 90% of the units IV to the units II. Sulphonation using concentrated sulphuric acid is described in European Patent Specification No. 8894.

The sulphonated copolymers used to produce membranes in accordance with the first aspect of the present invention are polymeric materials of high molecular weight such that the reduced viscosity (RV) of the polymer, measured as a 1% by weight solution of the polymer in dimethylformamide at 25° C., is at least 0.2 and preferably at least 0.4. The polymer may be such as to give an RV of up to 2.5 but it is generally preferred that the RV of the polymer does not exceed 2.0.

The copolymer which is to be sulphonated is conveniently prepared using a mixture of monomers to produce the desired repeat units III and IV and hence the units III and IV are distributed in a random fashion along the polymer chain. Hence, in the sulphonated copolymer, the units II and III, and IV if present, are also distributed in a random fashion along the polymer chain.

We have found that the membranes can be prepared by casting a solution of a barium salt of the sulphonated polysulphone wherein the barium content is in a specified range.

Hence, as a further aspect of the present invention, there is provided a sulphonated polysulphone derivative containing repeat units of the formula:

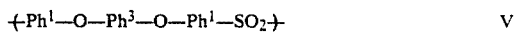    V together with the repeat units of the formula

    III and optionally with a minor proportion of repeat units of the formula

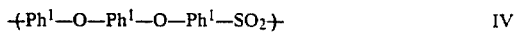    IV wherein $Ph^1$ represents a phenylene residue, preferably a paraphenylene residue;

$Ph^3$ represents a phenylene residue, preferably a paraphenylene residue, having one or two groups $-SO_3M^1$; and each $M^1$ is a hydrogen or a barium atom, the proportion of $M^1$ being sufficient to combine with the unsatisfied valencies of the group $-SO_3$ and the proportion of barium atoms is sufficient to combine with at least 85%, and not more than 91%, of the unsatisfied valencies of the group $-SO_3-$.

If units of the formula IV are present, they are preferably present in a molar proportion of not more than 25% molar of the units IV and V and especially not more 10% molar of the units IV and V.

The proportion of the barium atoms is preferably sufficient to combine with at least 86% and not more than 90% of the unsatisfied valencies of the group $-SO_3-$.

Membranes in accordance with the present invention can be prepared from a solution in a solvent mixture containing a sulphonated polyarylethersulphone, and a barium compound wherein the barium compound is present in an amount sufficient to provide barium atoms to combine with at least 85% and not more than 91% of the sulphonic acid groups present in the sulphonated polyarylethersulphone.

More specifically there is provided a solution containing a sulphonated polyarylethersulphone and a barium compound in the proportions hereinbefore specified in a solvent mixture containing at least three components each of which is a liquid or a low melting solid which is a non-solvent or poor solvent for the sulphonated polyarylethersulphone.

A preferred solvent mixture is one containing at least three components each of which is a non-solvent or poor solvent and which are (a) a liquid or a low melting solid containing at least one hydroxylic group and having a delta-H with a value of at least 8;

(b) a liquid or a low melting solid having a delta-D with a value of at least 8 and a delta-P with a value of not more than 3;

(c) a liquid or a low melting solid having a delta-P with a value of at least 8.5 and a delta-H with a value of not more than 3; wherein, at least in the presence of the sulphonated polyethersulphone, the solvent mixture forms a single liquid phase and none of the components of the solvent mixture reacts or complexes with another of the components of the solvent mixture or with the sulphonated polyarylethersulphone.

Alternatively, the solvent mixture can be as described in our copending application, of even date herewith, entitled "Polymer Solutions". More specifically, this alternative solvent mixture contains at least three components, each of which is a liquid or a low melting solid which is a non-solvent or poor solvent for the sulphonated polyarylethersulphone wherein at least one component of the solvent mixture is a compound which has a delta-H, a delta-P and a delta-D having values such that at least one of conditions (A), (B), (C) and/or (D) is satisfied:

(A) delta-D is less than 8 when delta-P is not more than 3.

(B) delta-H is greater than 3 when delta-P is at least 8.5; and/or (C) delta-H is less than 8 when the compound contains at least one hydroxylic group;

(D) delta-P is greater than 3 and less than 8.5 and the compound is free of hydroxylic groups; and, at least in the presence of the sulphonated polyarylethersulphone, the solvent mixture forms a single liquid phase and none of the components of the solvent mixture reacts or complexes with another of the components of the solvent mixture or with the sulphonated polyarylethersulphone.

The sulphonated polyarylethersulphone is preferably a material as described herein. The sulphonated polyarylethersulphone may be dissolved in the solvent mixture as the barium salt thereof or the barium salt may be formed in the solvent mixture.

By "low melting solid" in respect of the components of the solvent mixture is meant a material which is solid at ambient temperature and has a melting point of not more than 50° C. Although solvent mixtures which form a single liquid only on the addition of the sulphonated polyarylethersulphone may be used, we prefer that the components of the solvent mixture form a single liquid phase in the absence of the sulphonated polyarylethersulphone.

In the solvent mixture, delta-H, delta-D and delta-P are components of the solubility parameter of the solvent mixtures and of each material which is a component of the solvent mixture, and are related by the expression $$(\text{delta-O})^2 = (\text{delta-H})^2 + (\text{delta-D})^2 + (\text{delta-P})^2$$

where delta-O is the solubility parameter and is given by the expression $$(\text{delta} - 0) = \left(\frac{\Delta E_V}{V}\right)^{\frac{1}{2}}$$

where $\Delta E_v$ is the molar cohesive energy which approximates to $\Delta H$-RT;

$\Delta H$ is the latent heat of vaporisation;

R is the gas constant;

T is the absolute temperature; and

V is the molar volume.

More specifically, delta-H is the hydrogen bonding component of the solublity parameter, delta-D is the dispersion component of the solubility parameter and delta-P is the polar component of the solubility parameter.

The concept of solubility parameters is discussed in many papers in the scientific literature including, inter alia, a paper by C. M. Hansen in Ind. Eng. Chem. Prod. Res. Dev. 8, March 1969, pages 2 to 11. Other papers in which solubility parameters are considered are, inter alia, Chemical Reviews, 75 (1975), pages 731 to 753 and Kirk-Othmer "Encyclopedia of Chemical Technology", Second Edition, Supplemental Volume (1971) pages 889 to 910.

A tabulation of values of delta-H, delta-D and delta-P is given in the Hansen paper and these may be used to determine suitable materials for use as components (a), (b) and (c) of the solvent mixture or as components of the alternative solvent mixture.

Preferred materials for use as component (a) of the solvent mixture have a delta-H of at least 8, a delta-D of not more than 8 and a delta-P of at least 6. Especially preferred materials have a delta-H of greater than 10, a delta-D of less than 8 and a delta-P of at least 6. From the Hansen paper, few materials have a delta-H of the required value and only diethylene glycol, dipropylene glycol, methanol and water satisfy the requirements for the preferred materials.

Preferred materials for use as component (b) of the solvent mixture have a delta-D with a value at least 8, a delta-P of not more than 3 and a delta-H of not more than 4. Materials satisfying the preferred requirements include, inter alia, 1,4-dioxane, and several halohydrocarbons. Furan and tetrahydrofuran have the preferred values of delta-D, delta-P and delta-H but are excluded due to the tendency of these materials to complex with the sulphonated polysulphone. Many hydrocarbons, particularly cyclic hydrocarbons, have the preferred values of delta-D, delta-P and delta-H but do not form a single phase mixture with most materials used as components (a) and (c) of the solvent mixture, even in the presence of the sulphonated polyaryethersulphone.

Preferred materials for use as component (c) of the solvent mixture have a delta-P of at least 8.5, a delta-H of not more than 3 and a delta-D of at least 7.5. Materials satisfying the preferred requirements include inter alia, propylene carbonate, and ethylene carbonate.

The components of the solvent mixture are non-solvents or poor solvents for the sulphonated polysulphone and the barium salt thereof and the polymer is typically soluble in each of the components in an amount of not more than 5% by weight preferably less than 1% by weight, especially less than 0.1% by weight.

The sulphonated polysulphone and the barium salt thereof is preferably soluble in the solvent mixture in an amount of at least 10% by weight, more preferably at least 15% by weight, especially at least 20% by weight, for example 25 to 30% by weight. The quantity of polymer dissolved in the solvent mixture should be such that the resulting solution can be cast into a satisfactory membrane and this will be dependent not only on the components of the solvent mixture but also on the molecular weight of the polymer and the degree of sulphonation of the polymer.

The solvent mixture is preferably one which has a delta-H of value in the range from 4 to 5.5; a delta-P of value in the range from 4 to 8 and a delta-D of value in the range from 7.2 to 9.5. The components (a), (b) and (c) of the solvent mixture, and the proportions thereof, are preferably such that the solvent mixture has a delta-H, delta-P and delta-D in the preferred range.

A solvent mixture which may be used is one containing (a) $R^1OH$ or $R^1COOH$, where $R^1$ is a hydrogen atom or a hydrocarbyl group;
(b) an ether, particularly a cyclic ether; and
(c) an alkylene carbonate.

In the solvent mixture, the hydroxylic compound which is component (a) is preferably one in which $R^1$ is a hydrogen atom or a lower alkyl group, for example an alkyl group containing 1 to 6 carbon atoms. The hydroxylic compound is preferably a compound of the formula $R^1OH$, and is especially water. We have found that 1,4-dioxane is particularly suitable for use as component (b) of the solvent mixture. The alkylene carbonate which is component (c) of the solvent mixture is preferably one in which the alkylene group contains two or three carbon atoms and may be, for example, propylene carbonate or ethylene carbonate.

Membranes can be formed by casting and coagulating the solution of the sulphonated polysulphone and barium in the solvent mixture and it is preferred that the solvent mixture contains at least one component which has sufficient volatility so that this component at least partially evaporates during the casting of the solution, prior to immersing the cast film and support in the coagulation bath. It is also preferred that the barium salt of the sulphonated polysulphone has a reduced solubility in the residual solvent mixture which results as a consequence of the at least partial evaporation of the volatile component or components.

The solvent mixture may consist of four or more components but, for convenience of preparing the solvent mixture, it is preferred to minimise the number of components and hence the solvent mixture typically consists of three components.

A wide range of solvent mixtures can be used. For sulphonated polyarylethersulphones containing repeat units of formula II and formula III, and possibly also repeat units of formula IV, and the barium salts thereof, we have obtained a solvent mixture having satisfactory characteristics from a mixture consisting of propylene carbonate, 1,4-dioxane and water. This mixture suitably contains at least 15% by weight of propylene carbonate, at least 15% by weight of 1,4-dioxane, and not more than 25% by weight of water, the total amounts of the three components aggregating to 100% by weight. We particularly prefer that the mixture contains 5 to 20% by weight of water, 20 to 70% by weight of propylene carbonate and 20 to 66% by weight of 1,4-dioxane, the total amounts of the three components aggregating to 100% by weight. A useful solvent mixture consists of propylene carbonate, 1,4-dioxane and water and the weight ratios of 5:3:1.

The most suitable solvent mixtures for any particular sulphonated material depend not only on the basic polymer structure, that is the unsulphonated material, but also upon the sulphonation ratio of the polymer and also the nature of the barium salt produced. By "sulphonation ratio" we mean the ratio of the number of sulphonated phenylene residues in the sulphonated polymer to the number of unsulphonated phenylene residues in the sulphonated polymer. The sulphonation ratio is preferably determined by $C^{13}$ n.m.r., but infra-red techniques may also be used. We have found that titration (which gives a measure of the ion-exchange capacity of the polymer) generally indicates a lower degree of sulphonation than is found by n.m.r. or infra-red. Accordingly, although titration can be used, it is not the preferred technique for determining the sulphonation ratio. In general, polymers having lower sulphonation ratios require solvent mixtures in which the value of delta-H and delta-P for the solvent mixture is reduced. Preferably the polymers used in the process of the present invention have a sulphonation ratio of less than 1:5, particularly 1:7 or less. The sulphonation ratio is preferably not less than 1:20, especially not less than 1:15. Satisfactory results have been obtained using a polymer having a sulphonation ratio of about 1:10.

The solution may be prepared by dissolving the sulphonated polysulphone, including the barium slt thereof, in any suitable form, for example powder, chips, granules, in the solvent mixture to form a solution containing from 10% to 40% by weight of the sulphonated polysulphone. Dissolution of the polymer may be effected at ambient temperature but lower or higher temperatures may be used if desired. However, it will be appreciated that the temperature should be below the boiling point of any of the components of the solvent mixture.

The polymer which is dissolved in the solvent mixture may be added as the pre-formed barium salt thereof. However, the barium salts are not readily soluble, or are insoluble in the solvent mixture. Solutions of such salts can be obtained by dissolving the sulphonated polysulphone, in the acid form, in the solvent mixture and contacting the solution obtained with a compound of a barium to form the desired barium salt of the sulphonated polysulphone. The barium compound may be an oxide, hydroxide or carbonate but other compounds which are capable of reacting with the sulphonic acid group may also be used. We have obtained membranes having a combination of high salt rejection at a high water flux using barium oxide as the metal compound.

Using a procedure in which the solution of the sulphonated polysulphone is reacted with a barium compound of a divalent metal, the barium compound is used in an amount sufficient to react with at least 85% and not more than 91% of the sulphonic acid groups in the sulphonated polysulphone. However, it is particularly preferred to use the barium compound in an amount sufficient to react with from at least 86% and not more than 90% of the sulphonic acid groups.

The reaction of the barium compound with the solution containing the sulphonated polysulphone may be effected at essentially ambient temperature but higher or lower temperatures may be used if desired, for example in the range 0° C. to 100° C.

The solution of the sulphonated polysulphone and barium in the solvent mixture can be cast and coagulated to form a membrane.

More specifically, a sulphonated polysulphone in the acid form is dissolved in a solvent mixture containing
(a) at least one alkylene carbonate;
(b) at least one ether; and
(c) at least one hydroxyl compound selected from
$R^1COOH$ and
$R^1OH$,
the solution is contacted with a barium compound in an amount to react with at least 85% and not more than 91%, of the sulphonic acid groups in the sulphonated polysulphone, any solid unreacted quantity of the barium compound is separated from the solution, the solution is cast onto a support to form a film of the solution on the support, the film and support are immersed in a coagulation bath and a membrane is recovered wherein $R^1$ is a hydrogen atom or a hydrocarbyl group.

The solution of the barium salt of the sulphonated polysulphone is formed into a membrane by casting on a support. Casting onto the support may be effected at essentially ambient temperature but lower or higher temperatures may be used if desired. The support may be for example a non-porous plane surface such as a glass or metal plate or, alternatively, may be a porous support such as a fabric and, where appropriate, it may have some other shape. Sufficient of the solution is cast on to the support in conventional manner to give a film of the desired thickness which may be adjusted as necessary by suitable mechanical means. It is preferred to produce a film having a thickness of at least 20 micrometers and not more than 300 micrometers, most preferably from 50 up to 250 micrometers, and especially from 75 up to 200 micrometers. Alternatively, fine hollow fibres may be produced by extruding the solution through a die having a central mandrel, allowing some of the solvent to evaporate and then passing the fibres through a coagulation bath.

It is advantageous to allow at least partial evaporation of at least one component of the solvent mixture from the supported liquid film by exposing the latter to the atmosphere for a short time, 10 seconds to 5 minutes, before immersing the supported film in a coagulation bath. The coagulation bath may contain an aqueous solution, for example a solution of an inorganic salt such as sodium chloride or sodium nitrate, or may be a non-solvent liquid or liquid mixture, for example formed from one or more of the components of the solvent mixture. Preferably the coagulation bath is pure water. The temperature of the coagulation bath is generally between −20° C. and 60° C., and is preferably about 0° C. The coagulation treatment may be between 1 minute and several hours, for example between 5 and 60 minutes.

After the coagulation treatment, a membrane is recovered. In the case of a non-porous support, the membrane is detached from the support but in the case of a porous support, the membrane remains adhered to the support. The recovered membrane may be subjected to heat treatment in order to relax the structure. Such a treatemt preferably includes an immersion in an aqueous solution of an inorganic salt at an elevated temperature, typically from 70° C. to 150° C. This heat treatment may be effected with the membrane being held under pressure (4 to 100 $kN/m^2$), between porous supports such as porous graphite, sintered stainless steel or filter paper on a non-porous support. Once prepared, and after any heat treatment, the membrane is preferably washed with distilled water to remove any residual solvent and/or free ionic species and is then stored in distilled water until required.

The membranes as prepared by casting are formed from the sulphonated polysulphone predominantly in the form of the barium salt thereof. However, if the coagulation bath, and any subsequent heat treatment baths, contain an inorganic salt, ion exchange may occur between the barium ions in the membrane and the metal ions in the solution. Hence, in the membrane obtained, some, or all, of the barium ions may have been replaced by other metal ions or even hydrogen ions.

Before being used for treatment of liquids, the membranes may be treated with a suitable acid to convert the salt of the sulphonated polysulphone into the acid form thereof, and it should be appreciated that the present invention is not restricted to the sulphonated polysulphone in the acid form or in the form of any specific metal salt.

To reduce the possibility of variations in membrane properties, it is desirable that all stages in the preparation of the casting solution and the casting and coagulation steps are effected under carefully controlled conditions of time, temperature and humidity. During the casting and subsequent evaporation, it is preferred that the humidity does not exceed about 65% relative humidity, for example in the range 35 to 50% relative humidity.

Membranes obtained by the method of the invention may be used for the treatment of a wide variety of aqueous or non-aqueous solutions or suspensions by conventional reverse osmosis or ultrafiltration techniques. In particular, they may be used for the desalination of sea water and for the purification of water including brackish waters and industrial effluents.

Membranes formed from sulfonated polysulphones are more resistant to the presence of aggressive materials such as acids and alkalis. Hence, using membranes formed from sulphonated polysulphones, aqueous solutions may be treated in the presence of aggressive materials at levels which can cause deterioration of membranes formed from other materials such as cellulosics.

The accompanying drawing is a diagrammatic representation of a reverse osmosis cell in which the membranes of the present invention may be used.

The cell comprises a closed vessel 1 which is divided into two sections internally by a membrane 2. The membrane 2 is in contact with a sheet 3 of a porous material for example filter paper, and sheet 3 is supported by a porous plate 4 which is not semi-permeable and which assists in preventing mechanical deformation of the membrane 2. The membrane 2, the sheet 3 and porous plate 4 are clamped at their edges to prevent leaking around the edges. The vessel 1 is divided by the membrane 2 into a large section 5 and a small section 6. The large section 5 is provided with two pipelines 7 and 8 for the supply and removal of liquid. The small section 6 is provided with a pipeline 9. In use, liquid under pressure, for example sea water at a pressure of 4 $MNm^{-2}$ or higher, is passed into section 5 of the vessel 1 through pipeline 7 and is withdrawn through pipeline 8. The pressure is sufficient to cause reverse osmosis and some water passes through the membrane 2 into the section 6 from which it is withdrawn through the pipeline 9. The apparatus can be operated at ambient temperature (about 25° C.) but higher temperatures may be used. In a continuous process, a further pipeline may be connected to section 6 of the vessel 1 whereby a continuous flow of a carrier liquid, which is the liquid being collected, is passed through section 6. Other modifications and variations may be effected in the manner known to those skilled in the art.

Various aspects of the present invention are illustrated, but not limited, by the following Examples, in which all parts and percentages are by weight unless otherwise indicated.

EXAMPLE 1

A sulphonated polyarylethersulphone copolymer containing about 20% mole of units II, about 80% mole of units III (as defined herein) in which $Ph^1$ and $Ph^2$ are para-phenylene residues and M is a hydrogen atom, having a sulphonation ratio of 1:10, and a reduced viscosity (as defined herein) of 0.82, was dissolved, at a temperature of 25° C., in a 5:3:1 parts by weight propylene carbonate/1,4-dioxane/water mixture to give a 26% parts by weight solution of the copolymer in the solvent mixture. The solvent mixture had a delta-D of 9.17, a delta-P of 6.8 and a delta-H of 4.4, as calculated from the values quoted in the Hansen paper.

Barium oxide (BDH Technical Grade which, by analysis, was found to be of purity 95% and particle size less than 10 micrometers) was added to the solution in an amount sufficient to convert 87.4 of the sulphonic acid groups into the corresponding barium salt form. The mixture was stirred at 25° C. for 10 hours by which time all of the added solid barium oxide had dissolved. The solution was filtered through a gauze with a mesh size of 30 micrometers and then centrifuged at 2000 r.p.m. for 20 to 30 minutes.

The solution obtained was cast on to a glass plate and the thickness of the film was adjusted manually using a brass spreader bar. The film so formed was exposed to the atmosphere at the ambient temperature for one minute before being coagulated by immersion in dlistilled water at 0° C. for 30 minutes. The membrane was washed with distilled water and then stored in distilled water until tested.

The membrane was tested using an apparatus of the type hereinbefore described and in which the membrane was placed in contact with a porous support and the exposed side, being the side exposed to the air during casting, was subjected to a continuous feed of 0.2% aqueous sodium chloride solution pumped across the surface of the membrane at a gauge pressure of 600 p.s.i. (4.14 $MNm^{-2}$) and a temperature of 25° C. The liquid passing through the membrane was analysed. The results obtained are set out in the following Table

EXAMPLES 2 AND 3

The procedure of Example 1 was repeated using different proportions of barium oxide within the range from 85% up to 91%.

COMPARATIVE EXAMPLES A AND B

The procedure of Example 1 was repeated using different proportions of barium oxide in an amount of less than 85%

The results of testing the membranes of Examples 1 to 3 and the Comparative Examples are given in following Table.

TABLE

| Example or Comparative Example | % Ba (a) | S.R. (%) (b) | Flux (m·day$^{-1}$) (c) | M.F. (d) |
|---|---|---|---|---|
| 1 | 87.4 | 99.56 / 99.40 | 0.40 / 0.57 | 0.91 / 0.95 |
| 2 | 85.5 | 98.11 / 98.24 | 1.56 / 0.80 | 0.825 / 0.455 |
| 3 | 90.25 | 98.89 / 98.25 | 0.37 / 0.93 | 0.333 / 0.531 |
| A | 76 | 82.41 | 2.73 | 0.155 |
| B | 83.6 | 97.06 | 0.67 | 0.228 |

Notes to Table
(a) % Ba is the amount of barium compound added as a percentage of that required to convert all of the sulphonic acid groups into the corresponding barium salt form, on the basis that the barium oxide used was 95%.
(b) S.R. is % salt rejection and is determined measuring the conductivity of the solution fed to the membrane cell and by measuring the conductivity of the solution permeating the membrane and using the relationship:-

$$\% \text{ salt rejection} = \left(1 - \frac{\text{conductivity of permeate}}{\text{conductivity of feed}}\right) \times 100.$$

(c) Flux is the volume (in $m^3$) of the solution which passes through a membrane area of one $m^2$ in one day and is expressed as $m \cdot day^{-1}$.
(d) M.F. is the membrane factor and is given by the relationship.

$$\frac{\text{Flux (in m·day}^{-1})}{(100 - \% \text{ salt rejection})}$$

We claim:
1. A sulphonated polyarylethersulphone containing repeat units of the formula:

$$-(Ph^1-O-Ph^3-O-Ph^1-SO_2)- \qquad (V)$$

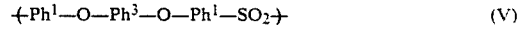

together with repeat units of the formula:

$$-(Ph^1-O-Ph^1-SO_2)- \qquad (III)$$

wherein
$Ph^1$ is a phenylene residue;
$Ph^3$ is a phenylene residue having one or two groups $-SO_3M^1$, wherein in some $-SO_3M^1$ groups $M^1$ is hydrogen and in other $-SO_3M^1$ groups $M^1$ is barium the proportion of the groups $-SO_3M^1$ in which $M^1$ is barium being at least 85% and not more than 91% of the total of the $-SO_3M^1$ groups.

2. A sulphonated polyarylethersulphone according to claim 1, which contains also a minor proportion of repeat units of the formula:

$$-(Ph^1-O-Ph^1-O-Ph^1-SO_2)- \qquad (IV)$$

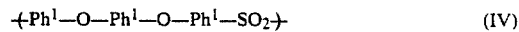

wherein $Ph^1$ is a phenylene residue.

3. A sulphonated polyarylethersulphone according to claim 1, wherein the proportion of the groups $-SO_3M^1$ in which $M^1$ is barium is at least 86% and not more than 90% of the total of said groups.

4. A sulphonated polyarylethersulphone according to claim 2, wherein the proportion of the groups $-SO_3M^1$ in which $M^1$ is barium is at least 86% and not more than 90% of the total of said groups.

5. A sulphonated polyarylethersulphone according to claim 3, wherein the proportion of the groups $-SO_3M^1$ in which $M^1$ is barium is about 87.4% of the total of said groups.

6. A sulphonated polyarylethersulphone according to claim 2, in which said minor proportion of repeat units of formula IV is not more than 25% molar of the total of the units of formula IV and the units of formula V.

7. A sulphonated polyarylethersulphone according to claim 2, in which said minor proportion of repeat units of formula IV is not more than 10% of the total of the units of formula IV and the units of formula V.

8. A sulphonated polyarylethersulphone according to claim 1, having a sulphonation ratio of substantially 1:10.

* * * * *